United States Patent
Han et al.

(10) Patent No.: US 11,310,832 B2
(45) Date of Patent: Apr. 19, 2022

(54) SIGNAL TRANSMISSION METHOD, CORRESPONDING EQUIPMENT AND STORAGE MEDIUM

(71) Applicant: ZTE CORPORATION, Shenzhen (CN)

(72) Inventors: Zhiqiang Han, Shenzhen (CN); Kaiying Lv, Shenzhen (CN); Bo Sun, Shenzhen (CN); Nan Li, Shenzhen (CN)

(73) Assignee: XI'AN ZHONGXING NEW SOFTWARE CO., LTD., Shenzhen (CN)

( * ) Notice: Subject to any disclaimer, the term of this patent is extended or adjusted under 35 U.S.C. 154(b) by 0 days.

(21) Appl. No.: 16/754,281

(22) PCT Filed: Sep. 29, 2018

(86) PCT No.: PCT/CN2018/108901
§ 371 (c)(1),
(2) Date: Apr. 7, 2020

(87) PCT Pub. No.: WO2019/072122
PCT Pub. Date: Apr. 18, 2019

(65) Prior Publication Data
US 2020/0329499 A1    Oct. 15, 2020

(30) Foreign Application Priority Data
Oct. 9, 2017 (CN) .......................... 201710929604.8

(51) Int. Cl.
*H04W 4/00* (2018.01)
*H04W 74/08* (2009.01)
(Continued)

(52) U.S. Cl.
CPC ....... *H04W 74/0816* (2013.01); *H04W 72/14* (2013.01); *H04W 76/11* (2018.02)

(58) Field of Classification Search
CPC . H04W 74/0816; H04W 76/11; H04W 72/14; H04W 74/002; H04W 72/1273; H04W 84/12; H04W 74/08
(Continued)

(56) References Cited

U.S. PATENT DOCUMENTS

| 8,989,066 B2 | 3/2015 | Merlin et al. |
| 9,801,115 B2 | 10/2017 | Sadek |

(Continued)

FOREIGN PATENT DOCUMENTS

| CN | 102387549 A | 3/2012 |
| CN | 103067985 A | 4/2013 |

(Continued)

OTHER PUBLICATIONS

Translated-International Search Report and Written Opinion Form PCT/ISA/210 and PCT/ISA237, International Application No. PCT/CN2018/108901, pp. 1-5, International filing Date Sep. 29, 2018, dated Jan. 7, 2019.

(Continued)

*Primary Examiner* — Chuong T Ho
(74) *Attorney, Agent, or Firm* — Bond Schoeneck & King, PLLC; George McGuire

(57) ABSTRACT

Disclosed are a signal transmission method and a corresponding device. The method includes: acquiring a second-type target station that matches a first-type target station; making a channel reservation with the second-type target station; and after the reservation is completed, transmitting a first signal to the first-type target station.

18 Claims, 5 Drawing Sheets

(51) Int. Cl.
*H04W 76/11* (2018.01)
*H04W 72/14* (2009.01)

(58) Field of Classification Search
USPC .................................................. 370/329, 330
See application file for complete search history.

(56) References Cited

U.S. PATENT DOCUMENTS

| | | | |
|---|---|---|---|
| 10,638,516 | B2 | 4/2020 | Lv et al. |
| 2013/0235771 | A1 | 9/2013 | Hasegawa et al. |
| 2013/0235774 | A1 | 9/2013 | Jo et al. |
| 2015/0326492 | A1* | 11/2015 | Jeong ............... H04L 47/72 370/329 |
| 2016/0277973 | A1* | 9/2016 | Luo ................... H04W 28/26 |
| 2016/0353474 | A1* | 12/2016 | Zhang ............. H04W 72/0453 |
| 2017/0310386 | A1* | 10/2017 | Liu ................... H04B 7/2612 |
| 2018/0191545 | A1* | 7/2018 | Liu ................... H04W 72/042 |

FOREIGN PATENT DOCUMENTS

| | | |
|---|---|---|
| CN | 103068054 A | 4/2013 |
| CN | 103856959 A | 6/2014 |
| CN | 105519185 A | 4/2016 |
| CN | 105992387 A | 10/2016 |
| CN | 106788622 A | 5/2017 |
| EP | 2757850 A | 7/2014 |

OTHER PUBLICATIONS

Lee, I.G. et al. "Interference-Aware Self-Optimizing Wi-Fi Efficiency Internet of Things in Dense Networks" Computer Communications, Dec. 31, 2016 (Dec. 31, 2016), thesis, section 1, paragraphs 2 and 4, section 4.2 and section 5.3, paragraph 1.
Translated CN Office Action, dated Sep. 17, 2021, pp. 1-5.
Translated Search Report, dated Sep. 9, 2021, pp. 1-4.
"Interference-aware self-optimizing Wi-Fi for high efficiency internet of things in dense networks", Lee IL-GU, et al. Computer Communications.
European Search Report, dated Jun. 14, 2021—pp. 1-10.
Lee I L-GU et al.: "Interference-aware self-optimizing Wi-Fi for high efficiency internet of things in dense networks", Computer Communications, Elsevier Science Publishers BV, Amsterdam, NL vol. 89, Mar. 19, 2016 (Mar. 19, 2016) pp. 60-74, XP029621660, ISSN: 0140-3664, DOI 10.1016/J. COMCOM.2016.01.008.

* cited by examiner

SIGNAL TRANSMISSION METHOD, CORRESPONDING EQUIPMENT AND STORAGE MEDIUM

CROSS-REFERENCE TO RELATED APPLICATIONS

This is a National Stage Application, filed under 35 U.S.C. 371, of International Patent Application No. PCT/CN2018/108901, filed on Sep. 29, 2018, which claims priority to a Chinese patent application No. 201710929604.8 filed on Oct. 9, 2017, contents of both of which are incorporated herein by reference in their entireties.

TECHNICAL FIELD

The present disclosure relates to, but is not limited to, the field of communications, and in particular, relates to a signal transmission method, a corresponding device, and a storage medium.

BACKGROUND

With the increasing demand of the Internet of Things (IoT), for Wireless Local Area Networks (WLAN), currently a discussion about researching the IoT technology over a WLAN frequency band exists. Due to restrictions such as low cost and low power consumption of Internet of Things (IoT) devices as well as actual communication requirements, IoT devices cannot perform correct determination on existing WLAN signals, and WLAN devices cannot correctly determine IoT devices. Therefore when two types of devices perform transmission within a same frequency band, transmission interference exists.

SUMMARY

In order to overcome the above defects, embodiments of the present disclosure provide a signal transmission method, a corresponding device, and a storage medium.

A signal transmission method in the present disclosure includes the following steps.

A second-type target station that matches a first-type target station is acquired.

A channel reservation is made with the second-type target station.

After the reservation is completed, a first signal is transmitted to the first-type target station.

An access point device in the present disclosure includes a memory and a processor, where the memory is configured to store a signal transmission computer program and the processor is configured to execute the computer program to implement the steps of the above method.

A computer-readable storage medium in the present disclosure is configured to store a signal transmission computer program which, when executed by at least one processor, implements the steps of the above method.

In the method, device, and storage medium provided in the embodiments of the present disclosure, the second-type target station that matches the first-type target station is acquired, the channel reservation is made with the second-type target station, and after the reservation is completed, the first signal is transmitted to the first-type target station. Therefore interference between multiple types of devices and the access point within the same frequency band for data transmission or large conflicts can be effectively solved; and the same frequency interference and frequency usage conflicts are reduced.

DETAILED DESCRIPTION

The present disclosure provides a signal transmission method, a corresponding device, and a storage medium. The present disclosure is further described in detail below with reference to the drawings and embodiments. It is to be understood that specific embodiments described herein are intended to explain the present disclosure, and not to limit the present disclosure.

In the following description, terms such as "first" and "second" for distinguishing between elements are merely used for ease of description of the present disclosure, and have no specific meaning themselves.

Figure 1:
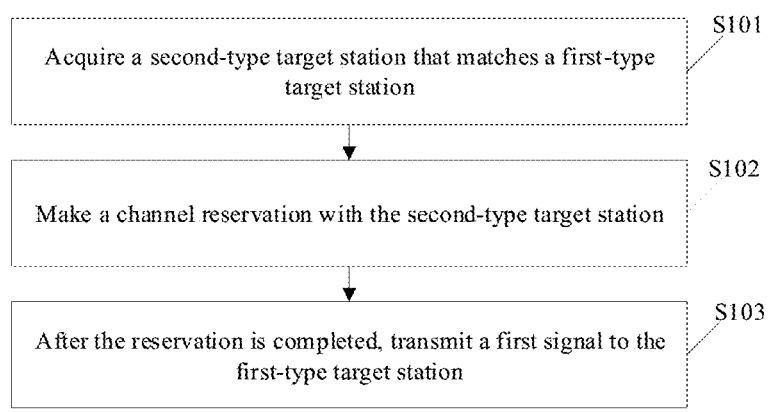
FIG. 1 is a flowchart of a data transmission method according to an embodiment of the present disclosure.

As shown in FIG. 1, an embodiment of the present disclosure provides a signal transmission method, and the method includes the following steps.

In S101, a second-type target station that matches a first-type target station is acquired.

In S102, a channel reservation is made with the second-type target station.

In S103, after the reservation is completed, a first signal is transmitted to the first-type target station.

The method in the embodiment of the present disclosure is executed in an access point.

In the embodiments of the present disclosure, the second-type target station that matches the first-type target station is acquired, the channel reservation is made with the second-type target station, and after the reservation is completed, the first signal is transmitted to the first-type target station. Therefore the interference between multiple types of devices and the access point within the same frequency band for data transmission can be effectively solved.

First-type stations are IoT device stations, the first-type target station is a target station among the first-type stations, second-type stations are wireless local area network device stations (hereinafter referred to as Normal STAs), and the second-type target station is a target station among the second-type stations.

The first-type stations and the second-type stations have one of the following differences.

The communication protocols followed are different.

The communication modes used are different.

Communication power consumption is different.

In an embodiment of the present disclosure, an operating bandwidth of the first-type target station is smaller than an operating bandwidth of the second-type target station.

The embodiments of the present disclosure are described in detail below.

Figure 2:
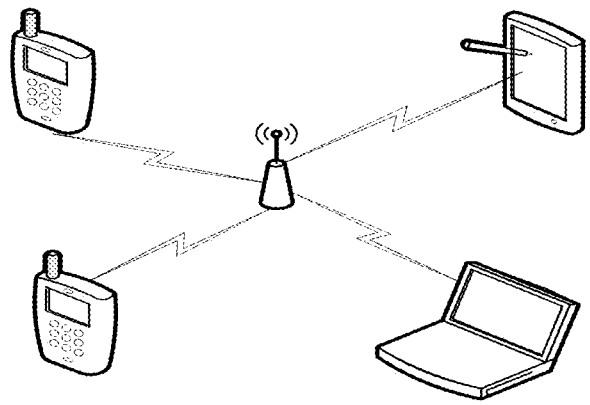
FIG. 2 is a schematic diagram of a basic service set according to an embodiment of the present disclosure.

As shown in FIG. 2, in a wireless local area network, an Access Point (AP) device (referred to as an access point in short) and multiple Stations (STAs) associated with the AP form a Basic Service Set (BSS). In the embodiment of the present disclosure, the station is referred to as a wireless local area network device station, for example, an entertainment or work device such as a smartphone, a tablet, and a notebook. The communication between the AP and the wireless local area network device station is in basic units of 20 MHz.

In the future wireless local area network, an access point may be associated with various types of devices. One type of device is a smartphone, a tablet, a notebook, or other devices used for entertainment, study, or work. This type of device has a high requirement for throughput and speed. This type of device often works within a large bandwidth, such as 20 MHz as the basic unit. In the embodiment of the present disclosure, this type of device is referred to as a Normal STA. Another type of device is the Internet of Things (IoT) device, and the type of device has a high requirement for power consumption, cost, coverage, and capacity.

Due to restrictions such as low cost and low power consumption of IoT devices and the actual communication requirements, the bandwidth required by IoT is often relatively small, such as 1 MHz, 2 MHz and 4 MHz. The IoT signal (referred to as the first signal in the embodiment of the present disclosure) is transmitted in the above narrow bandwidth. In the embodiment of the present disclosure, an IoT device that joins the above basic service set is referred to as an IoT device station or a Narrow Band STA (NB STA), such as, a sensor, home appliance, a smart light and other IoT devices.

In some embodiments, the operating bandwidth of the second-type target station is a Normal Band; the operating bandwidth of the first-type target station is a Narrow Band.

Therefore, the operating channels of the wireless local area network device station and the Internet of Things device station overlap each other, resulting in interference during transmission.

In the embodiment of the present disclosure, the first-type target station refers to the first-type station with which the access point is about to transmit a signal (that is, data).

In the embodiment of the present disclosure, the step of searching for the second-type target station that matches the first-type target station includes the following steps.

Preset parameter information of the first-type target station and preset parameter information of second-type stations are acquired.

The second-type target station is found out from the second-type stations on a basis of the acquired parameter information and according to a preset matching strategy.

In the embodiment of the present disclosure, the second-type target station is matched by using the acquired parameter information, so that the second-type target station can be efficiently found out.

The parameter information is any one or both of the following: location information or power information.

The matching strategy includes any one of the following.

1. A second-type station closest to the first-type target station is selected.

2. If at least two second-type stations closest to the first-type target station exist, any one second-type station is selected from the at least two second-type stations closest to the first-type target station, or a second-type station having higher power is selected from the at least two second-type stations closest to the first-type target station.

3. The second-type station having highest power is selected.

4. If at least two second-type stations having highest power exist, any one second-type station is selected from the at least two second-type stations having the highest power, or a second-type station closer to the first-type target station is selected from the at least two second-type stations having the highest power.

For example, the access point learns the location information and/or power information of all stations in the basic service set. These stations include a Normal STA (the second-type station, for example, the operating bandwidth is 20 MHz) and an NB STA (the first-type target station, for example, the operating bandwidth is 2 MHz or other small bandwidths).

In some embodiments, according to the location information of the first-type target station and the location information of each second-type station, the second-type station closest to the first-type target station is found out, where the found second-type station is the second-type target station.

In some embodiments, according to the power information of each second-type station, a second-type station with the highest power (for example, transmit power) is found out, where the found second-type station is the corresponding second-type target station.

In some embodiments, according to the location information and power information of each station, a comprehensive determination is made to find out the second-type station, where the found second-type station is a corresponding second-type target station.

Before the AP transmits data to the NB STA, the AP first acquires the locations of the Normal STAs around the NB STA, and then selects a Normal STA (the corresponding second-type target station) that best matches the target NB STA (the first-type target station) from the candidate second-type stations according to the location information and transmits an RTS frame to the Normal STA, where the Normal STA responds to the CTS frame.

In the embodiment of the present disclosure, the step of making a channel reservation with the second-type target station includes the following step.

The channel reservation is made with the second-type target station within an operating bandwidth corresponding to the second-type target station.

In the embodiment of the present disclosure, the second-type target station that matches the first-type target station is found out, so that channel protection is first performed within a large bandwidth on the second-type target station, and then data is transmitted to the first-type target station within a small bandwidth, and therefore the interference exists during transmission since the operating channels of IoT devices and wireless local area network (WLAN) devices overlap each other can be effectively solved.

The step of making the channel reservation with the second-type target station within an operating bandwidth corresponding to the second-type target station includes the following step.

Within the operating bandwidth corresponding to the second-type target station, a Request to Send frame is sent to the second-type target station, and a Clear to Send frame with which the second-type target station responds is received.

Alternatively, within the operating bandwidth corresponding to the second-type target station, a short data frame or a null data frame or a Quality of Service null data frame is sent to the second-type target station, and an acknowledgement frame with which the second-type target station responds is received.

In the embodiment of the present disclosure, the step of transmitting a first signal to the first-type target station includes the following step.

The first signal is transmitted to the first-type target station within an operating bandwidth corresponding to the first-type target station.

Before the first signal is transmitted to the first-type target station within the operating bandwidth corresponding to the first-type target station, the method includes the following step.

A second signal is transmitted, where the second signal at least includes: a non-high throughput (non-HT) short training field (L-STF), a non-high throughput long training field (L-LTF), and a non-high throughput signal field (L-SIG).

In the embodiment of the present disclosure, the robustness can be enhanced through the second signal so that the channel reservation with the second-type target station continues to be made, and therefore Normal STAs can be effectively prevented from not receiving the subsequent Normal Band signals for NAV resetting after receiving the RTS for setting Network Allocation Vectors (NAV).

A space between the second signal and the first signal is zero or a short interframe space (SIFS), or another predefined space.

For example, before the AP transmits data to STA1, the AP first sends within the Normal Band a signal that the Normal STA can receive, where the signal is a PHY Preamble-type target station (physical layer preamble) of the Normal Band and includes at least a non-HT short training field (L-STF), a non-HT long training field (L-LTF), and a non-HT signal field (L-SIG). The robustness can be enhanced and Normal STAs can be prevented from not receiving the subsequent Normal Band signals for NAV resetting after receiving RTS for setting NAVs.

The first signal is an Internet of Things signal, and the second signal is a wireless local area network signal.

The first-type target station is an Internet of Things device station, and the second-type target station is a wireless local area network device station.

The method in the embodiment of the present disclosure is described below with two application scenarios.

Application Scenario One

In the future smart home, through the WLAN network, IoT devices such as sensors, home appliances, smart lights may be connected, and entertainment or work devices such as smartphones, tablets and notebooks can also be connected. Here, smartphones, tablets and other devices are referred to as Normal STAs and perform sending and receiving based on 20 MHz, and the operating bandwidth of these devices is referred to as a Normal band Sensors, home appliances, smart lights and other devices are referred to as NB STAs and perform sending and receiving based on a small bandwidth (smaller than 20 MHz), and the operating bandwidth of these devices is referred to as a Narrow Band. The operating channels of these two types of devices overlap each other, and interference exists during transmission.

In the scenario, before the AP transmits data to the NB STA, in order to avoid the interference from the Normal STA, the AP searches for the recorded location information and finds out the Normal STA that best matches the NB STA according to the location information. Of course, the recorded location information and power information may also be searched for, and the Normal STA that best matches the NB STA is found according to the location information and power information.

The AP first sends a Request to Send (RTS) frame to the Normal STA within the Normal Band, and then the Normal STA responds with a Clear to Send (CTS) frame within the Normal Band. The AP then transmits data to the NB STA, and the NB STA performs acknowledgement within the Narrow Band.

The AP may also transmit a short data frame, or a QoS null data frame, or a null data frame to the Normal STA within the Normal Band. Then, the Normal STA replies with an acknowledgement (ACK) frame within the Normal Band. The AP then transmits data to the NB STA, and the NB STA performs acknowledgement within the Narrow Band.

In addition, the AP searches for a Normal STA that matches the NB STA, which is not limited by the parameters listed here. The AP can also search for the matching Normal STA based on whether the capability is supported and the current state (such as whether the power save mode is used).

Figure 3:
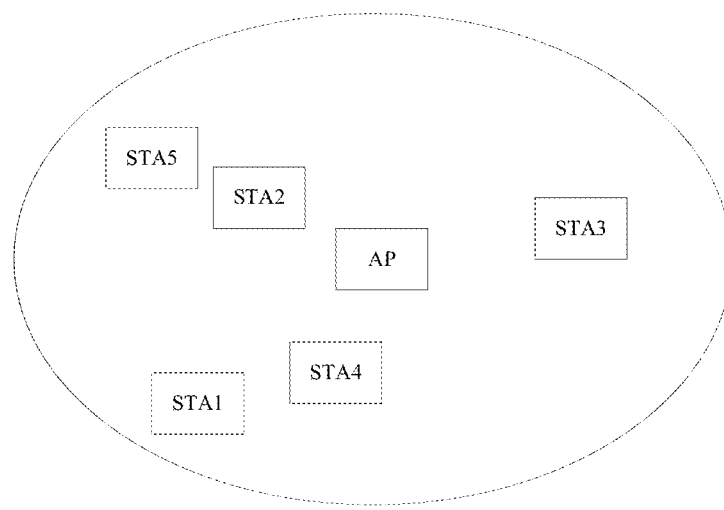
FIG. 3 is a schematic diagram of a scenario where a Normal station (STA) and a Narrow Band (NB) STA are mixed in a home scenario according to an embodiment of the present disclosure.

For example, in the home scenario shown in FIG. 3, STA1, STA3, and STA5 are NB STAs, and STA2 and STA4 are Normal STAs.

The AP records the locations of all Normal STAs and NB STAs associated with the AP itself. The AP desires to transmit data to STA1 (an NB STA). In order to protect the data transmitted to STA1, the AP searches for a Normal STA whose location best matches the location of STA1, for example, the best matching refers to the closest distance. Of course, the best matching may also be jointly determined according to the position information and power information.

Figure 4:
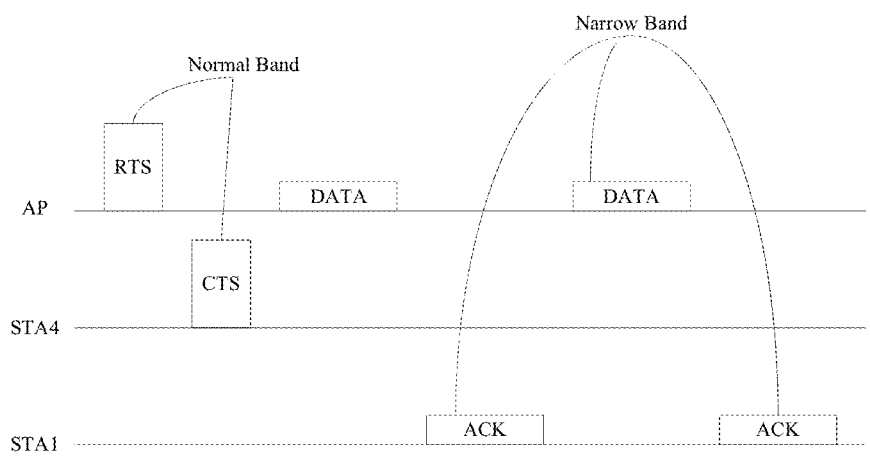
FIG. 4 is a schematic diagram of protecting downlink transmission through Request to Send (RTS)/Clear to Send (CTS) in a home scenario according to an embodiment of the present disclosure.

As shown in FIG. 4, the AP finds that STA4 matches best. The AP first transmits RTS to the STA4 within the Normal Band, and then the STA4 replies with CTS within the Normal Band. Finally, after the AP receives the CTS, the AP transmits first signal data (DATA) to the STA1 within the Narrow Band.

Figure 5:
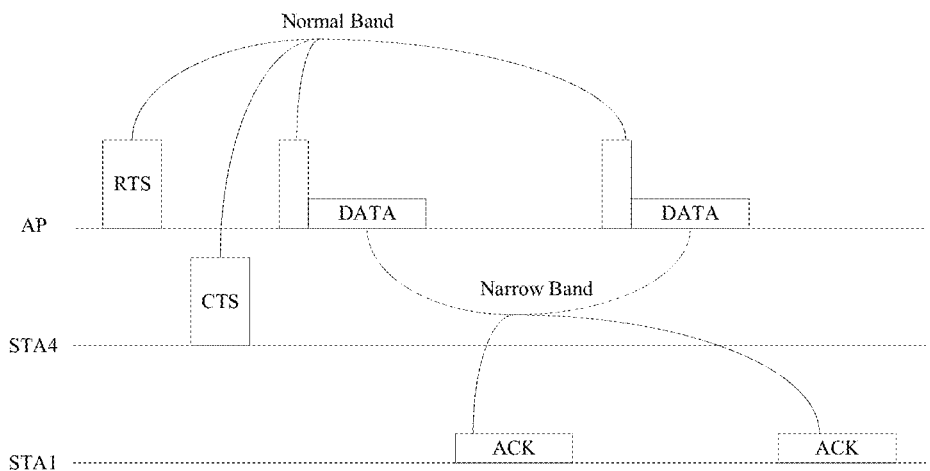
FIG. 5 is a schematic diagram of protecting downlink transmission through RTS/CTS and PHY Preamble of Normal Band in a home scenario according to an embodiment of the present disclosure.

In order to enhance the robustness, the process shown in FIG. 5 may also be adopted. After the AP completes the RTS and CTS interaction with the STA4 within the Normal Band and before the AP transmits data to the STA1, the AP first sends within the Normal Band a signal that the Normal STA may receive. The signal is the PHY Preamble of the Normal Band and at least includes a non-HT short training field (L-STF), a non-HT long training field (L-LTF), and a non-HT signal field (L-SIG). Therefore Normal STAs can be prevented from not receiving the subsequent Normal Band signals for NAV resetting after receiving RTS for setting NAVs.

Application Scenario Two

In the future smart buildings, through the WLAN network, various IoT devices such as sensors and smart lights may be connected, and devices such as video surveillance devices may also be connected. Video surveillance devices and other devices are referred to as Normal STAs and perform sending and receiving based on 20 MHz, and the operating bandwidth of these devices is referred to as a Normal band. Sensors, smart lights and other devices are referred to as NB STAs and perform sending and receiving based on a small bandwidth (smaller than 20 MHz), and the operating bandwidth of these devices is referred to as a Narrow Band. The operating channels of these two types of devices overlap each other, and interference exists during transmission.

In the scenario, the AP may perform transmission to multiple NB STAs. Before the AP transmits data to multiple NB STAs, in order to avoid the problem of interference from Normal STAs, the AP searches for the recorded location information and finds out one or more Normal STAs that best match the multiple NB STAs according to the location information. The AP first sends a Multi-user request to send (MU-RTS) frame to the one or more Normal STAs within the Normal Band, and then the one or more Normal STAs respond with Clear to Send (CTS) frames within the Normal Band. The AP then transmits data to the NB STAs, and the NB STAs perform acknowledgement.

Figure 6:
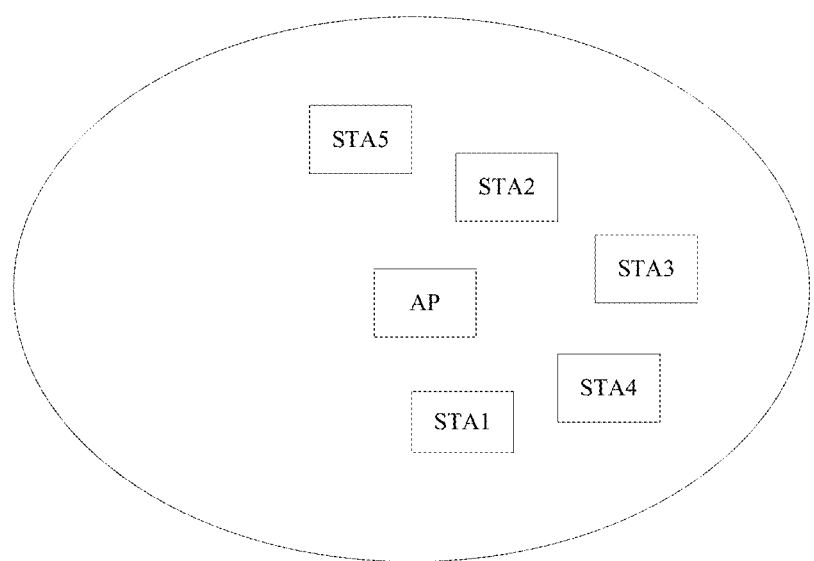
FIG. 6 is a schematic diagram of a scenario where a Normal STA and an NB STA are mixed in a smart building scenario according to an embodiment of the present disclosure.

For example, in the scenario shown in FIG. 6, STA1, STA3, and STA5 are NB STAs, and STA2 and STA4 are Normal STAs.

The AP records the locations of all Normal STAs and NB STAs associated with the AP itself. The AP desires to transmit data to STA1 and STA3. In order to protect the transmission to STA1 and STA3, the AP searches for Normal STAs that match STA1 and STA3.

Figure 7:
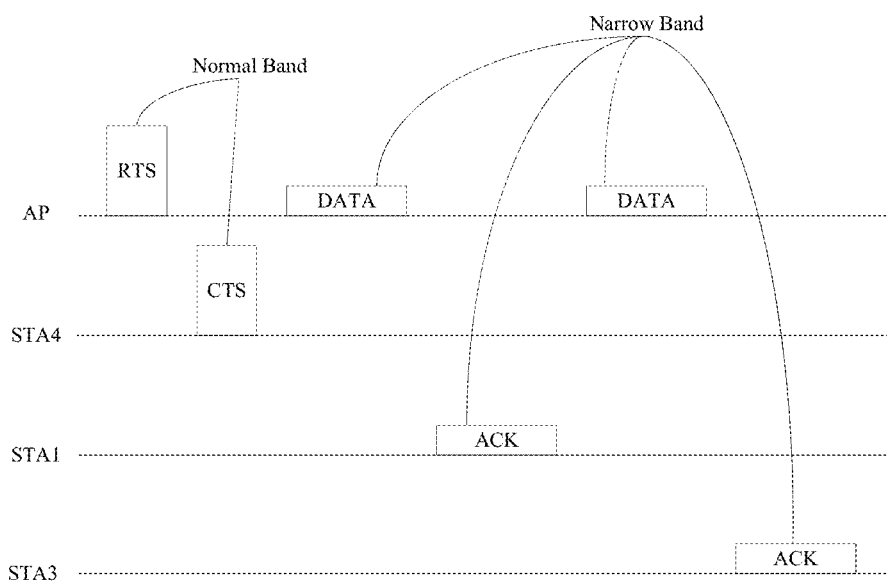
FIG. 7 is a schematic diagram of protecting downlink transmission through RTS/CTS of Normal Band in a smart building scenario according to an embodiment of the present disclosure.
Figure 8:
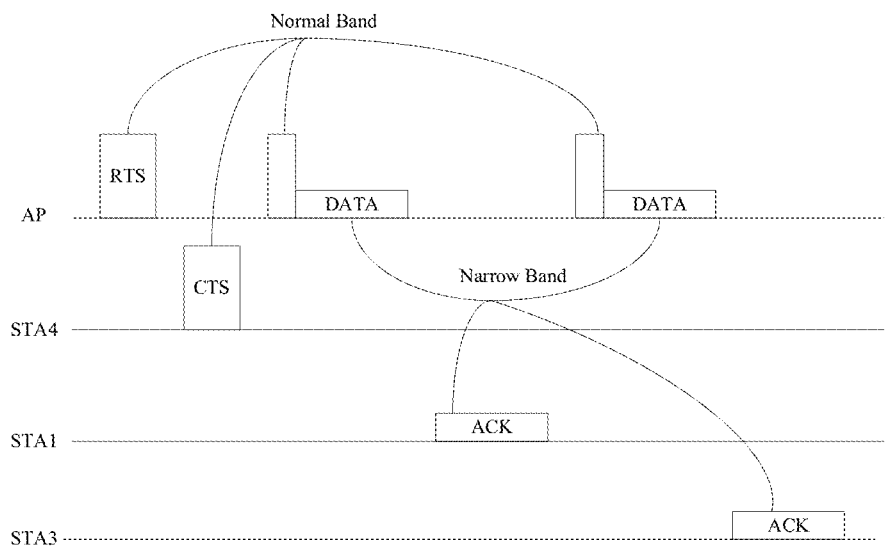
FIG. 8 is a schematic diagram of protecting downlink transmission through RTS/CTS and PHY Preamble of Normal Band in a smart building scenario according to an embodiment of the present disclosure.

As shown in FIG. 7 or FIG. 8, during the search, a same Normal STA may match STA1 and STA3, or may be a same Normal STA, such as STA4, exists in the list of Normal STAs matching STA1 and STA3. The AP first transmits RTS to STA4 within the Normal Band, and then STA4 replies with CTS within the Normal Band. After the AP receives the CTS, the AP transmits data to STA1 and STA3 within the narrow band.

Figure 9:
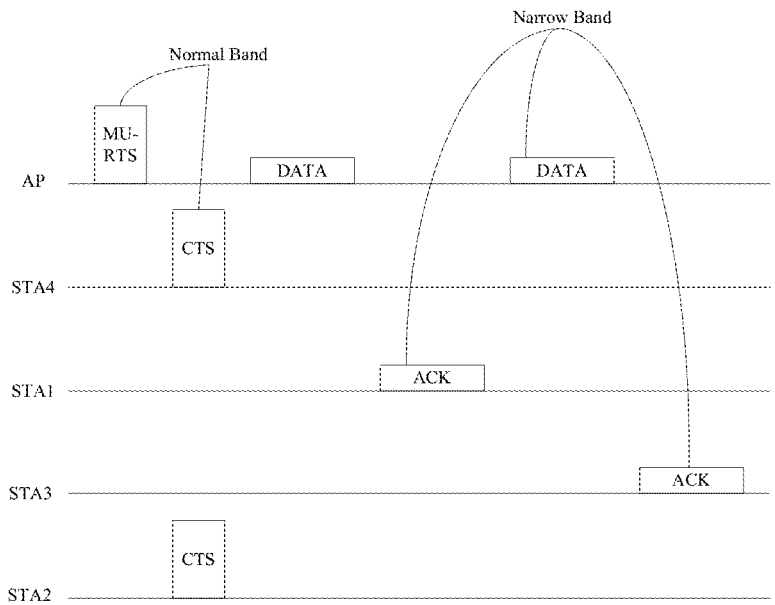
FIG. 9 is a schematic diagram of protecting downlink transmission through Multi-user request to send (MU-RTS)/CTS of Normal Band in a smart building scenario according to an embodiment of the present disclosure.
Figure 10:
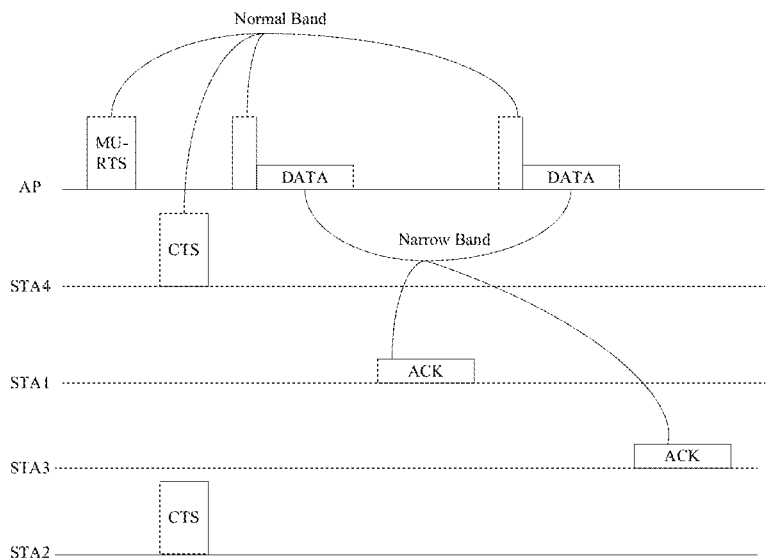
FIG. 10 is a schematic diagram of protecting downlink transmission through MU-RTS/CTS and PHY Preamble of Normal Band in a smart building scenario according to an embodiment of the present disclosure.

As shown in FIG. 9 or FIG. 10, during the search, STA2 and STA4 match STA1 and STA3. The AP first transmits MU-RTS to STA2 and STA4 within the Normal Band, and then STA2 and STA4 reply with CTS within the Normal Band. After the AP receives the CTS, the AP transmits data to STA1 and STA3.

Figure 11:
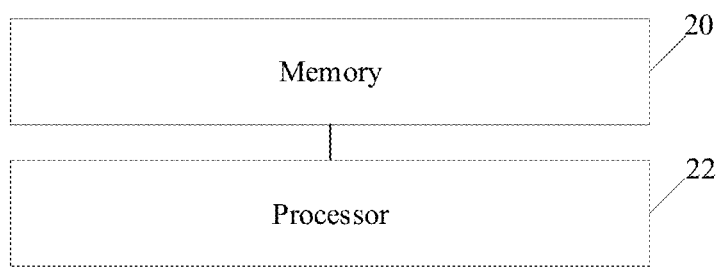
FIG. 11 is a schematic structural diagram of an access point device according to an embodiment of the present disclosure.

As shown in FIG. 11, an embodiment of the present disclosure provides an access point device. The access point device includes a memory 20 and a processor 22, where the memory 20 is configured to store a data transmission computer program and the processor is configured to execute the computer program to implement the steps of the method according to any one of the above embodiments.

In the embodiment of the present disclosure, the second-type target station that matches the first-type target station is searched for, then the channel reservation is made with the second-type target station, and after the reservation is completed, the first signal is transmitted to the first-type target station. Therefore the interference in data transmission between multiple types of devices and the access point within the same frequency band can be effectively solved.

In detail, the processor executes the computer program to implement the following steps.

A second-type target station that matches a first-type target station is acquired.

A channel reservation is made with the second-type target station.

After the reservation is completed, a first signal is transmitted to the first-type target station.

In an embodiment of the present disclosure, an operating bandwidth of the first-type target station is smaller than an operating bandwidth of the second-type target station.

In the embodiment of the present disclosure, the step of searching for the second-type target station that matches the first-type target station includes the following steps.

The preset parameter information of the first-type target station and the preset parameter information of second-type stations are acquired.

The second-type target station is found out from the second-type stations on the basis of the acquired parameter information and according to a preset matching strategy.

The parameter information is any one or two of the following: location information or power information.

The following matching strategy is included.

A second-type station closest to the first-type target station is selected.

Alternatively, if at least two second-type stations closest to the first-type target station exist, any one second-type station is selected from the at least two second-type stations closest to the first-type target station, or a second-type station having higher power is selected from the at least two second-type stations closest to the first-type target station.

Alternatively, the second-type station having the highest power is selected.

Alternatively, if at least two second-type stations having the highest power exist, any one second-type station is selected from the at least two second-type stations having the highest power, or a second-type station closer to the first-type target station is selected from the at least two second-type stations having the highest power.

In the embodiment of the present disclosure, the step of making a channel reservation with the second-type target station includes the following step.

The channel reservation is made with the second-type target station within an operating bandwidth corresponding to the second-type target station.

In the embodiment of the present disclosure, the step of making the channel reservation with the second-type target station within an operating bandwidth corresponding to the second-type target station includes the following step.

Within the operating bandwidth corresponding to the second-type target station, a Request to Send frame is sent to the second-type target station, and a Clear to Send frame with which the second-type target station responds is received.

Alternatively, within the operating bandwidth corresponding to the second-type target station, a short data frame or a null data frame or a Quality of Service null data frame is sent to the second-type target station, and an acknowledgement frame with which the second-type target station responds is received.

In the embodiment of the present disclosure, the step of transmitting a first signal to the first-type target station includes the following step.

The first signal is transmitted to the first-type target station within an operating bandwidth corresponding to the first-type target station.

In the embodiment of the present disclosure, before the first signal is transmitted to the first-type target station within an operating bandwidth corresponding to the first-type target station, the method includes the following step.

A second signal is transmitted, where the second signal at least includes: a non-high throughput short training field, a non-high throughput long training field, and a non-high throughput signal field.

A space between the second signal and the first signal is zero or a short interframe space.

The first signal is an Internet of Things signal, and the second signal is a wireless local area network signal.

The first-type target station is an Internet of Things device station, and the second-type target station is a wireless local area network device station.

An embodiment of the present disclosure provides a signal transmission apparatus, and the apparatus includes: an acquisition module, a reservation module and a transmission module.

The acquisition module is configured to acquire a second-type target station that matches a first-type target station.

The reservation module is configured to make a channel reservation with the second-type target station.

The transmission module is configured to transmit a first signal to the first-type target station after the reservation is completed.

In some embodiments, an operating bandwidth of the first-type target station is smaller than an operating bandwidth of the second-type target station.

In some embodiments, the acquisition module may further be configured to acquire parameter information of the first-type target station and parameter information of second-type stations and find out the second-type target station from the second-type stations on a basis of the acquired parameter information and according to a preset matching strategy.

In some embodiments, the parameter information is any one or two of the following: location information or power information.

In some embodiments, the following matching strategy is included.

A second-type station closest to the first-type target station is selected.

Alternatively, if at least two second-type stations closest to the first-type target station exist, any one second-type station is selected from the at least two second-type stations closest to the first-type target station, or a second-type station having higher power is selected from the at least two second-type stations closest to the first-type target station.

Alternatively, the second-type station having the highest power is selected.

Alternatively, if at least two second-type stations having the highest power exist, any one second-type station is selected from the at least two second-type stations having the highest power, or a second-type station closer to the first-type target station is selected from the at least two second-type stations having the highest power.

In some embodiments, the reservation module is configured to make the channel reservation with the second-type target station within an operating bandwidth corresponding to the second-type target station.

The reservation module may further be configured to: within the operating bandwidth corresponding to the second-type target station, send a Request to Send frame to the second-type target station, and receive a Clear to Send frame with which the second-type target station responds; or within the operating bandwidth corresponding to the second-type target station, send a short data frame or a null data frame or a Quality of Service null data frame to the second-type target station, and receive an acknowledgement frame with which the second-type target station responds.

The transmission module is configured to transmit the first signal to the first-type target station within an operating bandwidth corresponding to the first-type target station.

The transmission module may further be configured to transmit a second signal, where the second signal at least includes: a non-high throughput short training field, a non-high throughput long training field, and a non-high throughput signal field.

The space between the second signal and the first signal is zero or a short interframe space.

The first signal is an Internet of Things signal, and the second signal is a wireless local area network signal.

The first-type target station is an Internet of Things device station, and the second-type target station is a wireless local area network device station. An embodiment of the present disclosure provides a computer-readable storage medium. The computer-readable storage medium is configured to store a data transmission computer program which, when executed by at least one processor, implements the steps of any one of the methods of embodiment 1.

The computer-readable storage medium in the embodiments of the present disclosure may be a random access memory (RAM), a flash memory, a read-only memory (ROM), an Erasable Programmable Read-Only Memory (EPROM), an Electrically Erasable Programmable Read-only Memory (EEPROM), a register, a hard disk, a removable hard drive, a compact disc read-only memory (CD-ROM), or any other form of storage medium known in the art. A storage medium may be coupled to the processor, so that the processor can read information from the storage medium and write information to the storage medium, or the storage medium may be a component of the processor. The processor and the storage medium may be located in an application specific integrated circuit.

What is claimed is:

1. A signal transmission method, comprising:
acquiring a second-type target station that matches a first-type target station; making a channel reservation with the second-type target station; and
after the reservation is completed, transmitting a first signal to the first-type target station,
wherein the acquiring a second-type target station that matches a first-type target station comprises: acquiring parameter information of the first-type target station and parameter information of a plurality of second-type stations; and finding out the second-type target station from the second-type stations, on a basis of the acquired parameter information and according to a preset matching strategy.

2. The method of claim 1, wherein an operating bandwidth of the first-type target station is smaller than an operating bandwidth of the second-type target station.

3. The method of claim 1, wherein the parameter information comprises at least one of: location information or power information.

4. The method of claim 3, wherein the matching strategy comprises:
selecting a second-type station closest to the first-type target station; or
in response to determining that at least two second-type stations closest to the first-type target station exist, selecting any one second-type station from the at least two second-type stations closest to the first-type target station, or selecting a second-type station having higher power from the at least two second-type stations closest to the first-type target station; or
selecting a second-type station having highest power; or
in response to determining that at least two second-type stations having highest power exist, selecting any one second-type station from the at least two second-type stations having the highest power, or selecting a second-type station closer to the first-type target station from the at least two second-type stations having the highest power.

5. The method of claim 1, wherein the making a channel reservation with the second-type target station comprises:
making the channel reservation with the second-type target station within an operating bandwidth corresponding to the second-type target station.

6. The method of claim 5, wherein the making the channel reservation with the second-type target station within an operating bandwidth corresponding to the second-type target station comprises:
within the operating bandwidth corresponding to the second-type target station, sending a Request to Send frame to the second-type target station, and receiving a Clear to Send frame responded by the second-type target station; or
within the operating bandwidth corresponding to the second-type target station, sending a short data frame or a null data frame or a Quality of Service null data frame to the second-type target station, and receiving an acknowledgement frame responded by the second-type target station.

7. The method of claim 1, wherein the transmitting a first signal to the first-type target station comprises:
transmitting the first signal to the first-type target station within an operating bandwidth corresponding to the first-type target station.

8. The method of claim 7, wherein before the transmitting the first signal to the first-type target station within an operating bandwidth corresponding to the first-type target station, the method comprises:
transmitting a second signal, wherein the second signal at least comprises: a non-high throughput short training field, a non-high throughput long training field, and a non-high throughput signal field.

9. The method of claim 8, wherein a space between the second signal and the first signal is zero or a short interframe space.

10. The method of claim 8, wherein the first signal is an Internet of Things signal and the second signal is a wireless local area network signal; and
the first-type target station is an Internet of Things device station, and the second-type target station is a wireless local area network device station.

11. An access point device, comprising a memory and a processor, wherein the memory is configured to store a signal transmission computer program and the processor is configured to:
acquiring a second-type target station that matches a first-type target station;
making a channel reservation with the second-type target station; and
after the reservation is completed, transmitting a first signal to the first-type target station,
wherein the processor is configured to acquire the second-type target station that matches the first-type target station in a manner of:
acquiring parameter information of the first-type target station and parameter information of a plurality of second-type stations; and
finding out the second-type target station the second-type stations, on a basis of the acquired parameter information and according to a preset matching strategy.

12. A non-transitory computer-readable storage medium, which is configured to store a signal transmission computer program which, when executed by at least one processor, causes the processor to:
acquire a second-type target station that matches a first-type target station; make a channel reservation with the second-type target station; and
after the reservation is completed, transmit a first signal to the first-type target station, wherein the acquire the second-type target station that matches the first-type target station comprises:
acquiring parameter information of the first-type target station and parameter information of a plurality of second-type stations; and
finding out the second-type target station the second-type stations, on a basis of the acquired parameter information and according to a preset matching strategy.

13. The device of claim 11, wherein an operating bandwidth of the first-type target station is smaller than an operating bandwidth of the second-type target station.

14. The device of claim 11, wherein the parameter information comprises at least one of: location information or power information.

15. The device of claim 14, wherein the matching strategy comprises:
selecting a second-type station closest to the first-type target station; or
in response to determining that at least two second-type stations closest to the first-type target station exist, selecting any one second-type station from the at least two second-type stations closest to the first-type target station, or selecting a second-type station having higher power from the at least two second-type stations closest to the first-type target station; or
selecting a second-type station having highest power; or
in response to determining that at least two second-type stations having highest power exist, selecting any one second-type station from the at least two second-type stations having the highest power, or selecting a second-type station closer to the first-type target station from the at least two second-type stations having the highest power.

16. The device of claim 11, wherein the processor is configured to make the channel reservation with the second-type target station in a manner of:
making the channel reservation with the second-type target station within an operating bandwidth corresponding to the second-type target station.

17. The device of claim 16, wherein the making the channel reservation with the second-type target station within an operating bandwidth corresponding to the second-type target station comprises:
- within the operating bandwidth corresponding to the second-type target station, sending a Request to Send frame to the second-type target station, and receiving a Clear to Send frame responded by the second-type target station; or
- within the operating bandwidth corresponding to the second-type target station, sending a short data frame or a null data frame or a Quality of Service null data frame to the second-type target station, and receiving an acknowledgement frame responded by the second-type target station.

18. The device of claim 11, wherein the processor is configured to transmit the first signal to the first-type target station in a manner of:
- transmitting the first signal to the first-type target station within an operating bandwidth corresponding to the first-type target station.

\* \* \* \* \*